Patented Feb. 18, 1947

2,415,837

UNITED STATES PATENT OFFICE 2,415,837

LUBRICANT OR THE LIKE

John M. Musselman, South Euclid, and Herman P. Lankelma, Shaker Heights, Ohio, assignors to The Standard Oil Company, Cleveland, Ohio, a corporation of Ohio No Drawing. Application June 4, 1943, Serial No. 489,703

22 Claims. (Cl. 252—46.6)

If an ester wax or organic oxygen-containing compound be treated with a phosphorus sulphide a reaction sets in at relatively low temperature, below the boiling point of water for the generality of materials, to the formation of thiophosphoric compound. If a higher temperature be employed, a different reaction results, with combining of sulphur and throwing out of phosphorus in sludge, substantially no phosphorus being combined. We have found that if such products be subjected to the action of sulphur or sulphur chloride or agents capable of liberating free sulphur, another reaction occurs, in which sulphur is then taken into combination in considerable amount, and thus where all the sulphur possible has been combined from reaction with phosphorus sulphide, the further reaction with sulphur can give an additional controlled in-put. The nature of the reactions is obscure and difficult to determine. There is some reason for believing that when these initial products are further subjected to the action of sulphur there is a formation of disulphides and polysulphides. In any event however, the combined sulphur content can be raised over what is possible with phosphorus sulphide alone, and of particular importance the amount of sulphur that can be combined can be controlled very closely. These products have excellent lubricating properties, and are especially advantageous in that they are effective in smaller amounts than known sulphur compounds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The material which is subjected to reaction with sulphur in accordance with the present invention, as indicated may be a reaction product of phosphorus sulphide, such as $P_2S_5$, $P_4S_3$, etc., on an organic oxygen-containing compound. The organic compound originally employed for the reaction product is desirably of rather high molecular weight, and preferably of at least 300° F. boiling point, and involves ester waxes, as lanolin, degras, sperm oil, esters, as alkyl or cycloparaffin or aryl esters of organic acids, fatty oils, higher alcohols, higher carboxylic acids, saturated and unsaturated, monobasic and dibasic, petroleum acids, naphthenic acid, rosin, modified rosins, also halogenated derivatives of any of these. Illustrative of some conveniently applicable materials are: beeswax, lanolin, sperm oil, other waxes, butyl stearate, ethyl lactate, methyl oleate, butyl ricinoleate, butyl phthalate, methyl stearate, methyl dichlorostearate, methyl chloronaphthenate, dichloropalmitic acid, cocoanut oil, lauric acid, other fatty oils, ethylene glycol mono ethers, diglycol chlorohydrin, lauryl alcohol, stearic acid, oleic acid, palmitic acid, myristic acid, naphthalic acid, naphthoic acid, benzoic acid, naphthenic acids, hydroxystearic acid, dihydroxybenzoic acids, hydroxynaphthenic acids, dihydroxystearic acid, chlorobenzoic acid, dichlorostearic acids, dichlorobenzoic acid, dichlorodihydroxystearic acid, lactones, oxidized petroleum fatty acid or other petroleum product, as oxidized wax, kerosene, gas oil or other oxidized petroleum oil, etc. And, as indicated, the first reaction or reaction with phosphorus pentasulphide or other phosphorus sulphide may be carried to thiophosphate formation, or preferably is carried to a higher temperature resulting in combination of sulphur in considerable percentage and substantially no combined phosphorus. Preferably, such reaction may be at a range of for instance 340 to around 400° F., or at least sufficient to give the products stated. Such product may then be subjected to reaction with sulphur. For this, the reaction product is subjected to the action of elemental sulphur, sulphur chloride or other agent yielding free sulphur, heat being applied as necessary to bring about combination. Five to ten per cent of sulphur may be applied, and the temperature may be 275° to 300° F., for 30 to 60 minutes.

As an example: The reaction product which has been prepared by heating degras with phosphorus pentasulphide at 300° F. for an hour is subjected to reaction with 10 per cent of flowers of sulphur and a temperature of 300° F. for an hour.

The products may be applied as such in certain usages, as gear lubrication, or may be incorporated in oil of lubricating viscosity, as for instance 40 to 3000 viscosity S. U. at 100° F., and in amounts for instance to provide 0.55 to 0.75 per cent combined sulphur in the oil, or larger amounts can be employed if desired, as up to 10 per cent or as much more of the product as is desired.

Illustrative of the action of improved lubricants, the following tests with a test engine of Ethyl Gasoline Corp. design operating at 212° F. jacket temperature and 300° F. sump temperature for twenty hours continuous run, may be noted:

To an S. A. E. 30 commercial Mid-Continent lubricating stock there is added a sulphur-treated degras-$P_2S_5$ reaction product to give a combined sulphur content 0.75. After the test, the oil showed 1.0 per cent of sludge, 3.0 acid number, viscosity increase 28, and piston free from any deposit.

Other modes of applying the principle of the invention may be employed, change being made as regards the details described, provided the features stated in any of the following claims, or the equivalent of such, be employed.

We therefore particularly point out and distinctly claim as our invention:

1. A composition of matter suitable for use as a lubricant and as an addition agent to a lubricating oil, which comprises the product of the reaction of sulfur reacted at a temperature at which sulfur reacts with the reaction product of a phosphorus sulfide reacted at a temperature of and above thiophosphate formation with an oxygen-containing compound selected from the group consisting of aliphatic, alicyclic and aromatic oxygen-containing compounds having a boiling point of at least 300° F. and forming an oil-miscible reaction product.

2. A composition of matter suitable for use as a lubricant and as an addition agent to a lubricating oil, which comprises the product of the reaction of sulfur reacted at a temperature at which sulfur reacts with the reaction product of a phosphorus sulfide and an oxidized petroleum product which is not more volatile than kerosene reacted at a temperature of and above thiophosphate formation.

3. A composition of matter suitable for use as a lubricant and as an addition agent to a lubricating oil, which comprises the product of the reaction of sulfur reacted at a temperature at which sulfur reacts with the reaction product of a phosphorus sulfide and a higher fatty acid boiling above 300° F. reacted at a temperature of and above thiophosphate formation.

4. A composition of matter suitable for use as a lubricant and as an addition agent to a lubricating oil, which comprises the product of the reaction of sulfur reacted at a temperature at which sulfur reacts with the reaction product of a phosphorus sulfide and lauric acid reacted at a temperature of and above thiophosphate formation.

5. A composition of matter suitable for use as a lubricant and as an addition agent to a lubricating oil, which comprises the product of the reaction of sulfur reacted at a temperature at which sulfur reacts with the reaction product of a phosphorus sulfide and an ester boiling above 300° F. reacted at a temperature of and above thiophosphate formation.

6. A composition of matter suitable for use as a lubricant and as an addition agent to a lubricating oil, which comprises the product of the reaction of sulfur with the reaction product of a phosphorus sulfide and an ester wax reacted at a temperature of and above thiophosphate formation.

7. A composition of matter suitable for use as a lubricant and as an addition agent to a lubricating oil, which comprises the product of the reaction of sulfur reacted at a temperature at which sulfur reacts with the reaction product of a phosphorus sulfide and degras reacted at a temperature of and above thiophosphate formation.

8. A composition of matter suitable for use as a lubricant and as an addition agent to a lubricating oil, which comprises the product of the reaction of sulfur reacted at a temperature at which sulfur reacts with the reaction product of a phosphorus sulfide and an oxygen-containing organic compound selected from the group consisting of aliphatic, alicyclic and aromatic oxygen-containing compounds having a boiling point of at least 300° F. and forming an oil-miscible reaction product reacted at a temperature above thiophosphate formation to form said reaction product containing sulfur from said phosphorus sulfide and separated from a residue containing phosphorus from said phosphorus sulfide.

9. A composition of matter suitable for use as a lubricant and as an addition agent to a lubricating oil, which comprises the product of the reaction of sulfur reacted at a temperature at which sulfur reacts with the reaction product of a phosphorus sulfide and an oxidized petroleum product which is not more volatile than kerosene reacted at a temperature above thiophosphate formation to form said reaction product containing sulfur from said phosphorus sulfide and separated from a residue containing phosphorus from said phosphorus sulfide.

10. A composition of matter suitable for use as a lubricant and as an addition agent to a lubricating oil, which comprises the product of the reaction of sulfur reacted at a temperature at which sulfur reacts with the reaction product of a phosphorus sulfide and a higher fatty acid boiling above 300° F. reacted at a temperature above thiophosphate formation to form said reaction product containing sulfur from said phosphorus sulfide and separated from a residue containing phosphorus from said phosphorus sulfide.

11. A composition of matter suitable for use as a lubricant and as an addition agent to a lubricating oil, which comprises the product of the reaction of sulfur reacted at a temperature at which sulfur reacts with the reaction product of a phosphorus sulfide and lauric acid reacted at a temperature above thiophosphate formation to form said reaction product containing sulfur from said phosphorus sulfide and separated from a residue containing phosphorus from said phosphorus sulfide.

12. A composition of matter suitable for use as a lubricant and as an addition agent to a lubricating oil, which comprises the product of the reaction of sulfur reacted at a temperature at which sulfur reacts with the reaction product of a phosphorus sulfide and an ester boiling above 300° F. reacted at a temperature above thiophosphate formation to form said reaction product containing sulfur from said phosphorus sulfide and separated from a residue containing phosphorus from said phosphorus sulfide.

13. A composition of matter suitable for use as a lubricant and as an addition agent to a lubricating oil, which comprises the product of the reaction of sulfur reacted at a temperature at which sulfur reacts with the reaction product of a phosphorus sulfide and an ester wax reacted at a temperature above thiophosphate formation to form said reaction product containing sulfur from said phosphorus sulfide and separated from a residue containing phosphorus from said phosphorus sulfide.

14. A composition of matter suitable for use as a lubricant and as an addition agent to a lubricating oil, which comprises the product of the reaction of sulfur reacted at a temperature at which sulfur reacts with the reaction product of a phosphorus sulfide and degras reacted at a temperature above thiophosphate formation to form said reaction product containing sulfur from said phosphorus sulfide and separated from a residue containing phosphorus from said phosphorus sulfide.

15. A composition of matter suitable for use as a lubricant and as an addition agent to a lubricating oil, which comprises the product of the reaction of sulfur reacted at a temperature at which sulfur reacts with the reaction product of phosphorus pentasulfide and degras reacted at a temperature above thiophosphate formation to form said reaction product containing sulfur from said phosphorus pentasulfide and separated from a residue containing phosphorus from said phosphorus pentasulfide.

16. A lubricant comprising a lubricating oil containing the product of the reaction of sulfur reacted at a temperature at which sulfur reacts with the reaction product of a phosphorus sulfide reacted at a temperature of and above thiophosphate formation with an oxygen-containing organic compound selected from the group consisting of aliphatic, alicyclic and aromatic oxygen-containing compounds having a boiling point of at least 300° F. and forming an oil miscible reaction product.

17. A lubricant comprising a lubricating oil containing the product of the reaction of sulfur reacted at a temperature at which sulfur reacts with the reaction product of a phosphorus sulfide and a higher fatty acid boiling above 300° F. reacted at a temperature of and above thiophosphate formation.

18. A lubricant comprising a lubricating oil containing the product of the reaction of sulfur reacted at a temperature at which sulfur reacts with the reaction product of a phosphorus sulfide and an ester boiling above 300° F. reacted at a temperature of and above thiophosphate formation.

19. A lubricant comprising a lubricating oil containing the product of the reaction of sulfur reacted at a temperature at which sulfur reacts with the reaction product of a phosphorus sulfide and degras reacted at a temperature of and above thiophosphate formation.

20. A lubricant comprising a lubricating oil containing the product of the reaction of sulfur reacted at a temperature at which sulfur reacts with the reaction product of a phosphorus sulfide and an oxygen-containing organic compound selected from the group consisting of aliphatic, alicyclic and aromatic oxygen-containing compounds having a boiling point of at least 300° F. and forming an oil-miscible reaction product reacted at a temperature above thiophosphate formation to form said reaction product containing sulfur from said phosphorus sulfide and separated from a residue containing phosphorus from said phosphorus sulfide.

21. A lubricant comprising a lubricating oil containing the product of the reaction of sulfur reacted at a temperature at which sulfur reacts with the reaction product of phosphorus pentasulfide and an ester boiling above 300° F. reacted at a temperature above thiophosphate formation to form said reaction product containing sulfur from said phosphorus pentasulfide and separated from a residue containing phosphorus from said phosphorus pentasulfide.

22. A lubricant comprising a lubricating oil containing the product of the reaction of sulfur reacted at a temperature at which sulfur reacts with the reaction product of phosphorus pentasulfide and degras reacted at a temperature above thiophosphate formation to form said reaction product containing sulfur from said phosphorus pentasulfide and separated from a residue containing phosphorus from said phosphorus pentasulfide.

JOHN M. MUSSELMAN.
HERMAN P. LANKELMA.

REFERENCES CITED

The following references are of record in the file of this patent:

UNITED STATES PATENTS

| Number | Name | Date |
| --- | --- | --- |
| 2,167,867 | Benning | Aug. 1, 1939 |
| 2,242,260 | Prutton | May 20, 1941 |
| 2,316,087 | Gaynor | Apr. 6, 1943 |
| 2,246,281 | Zimmer | June 17, 1941 |
| 2,246,282 | Zimmer | June 17, 1941 |
| 2,308,427 | Roehner | Jan. 12, 1943 |
| 2,362,624 | Gaynor | Nov. 14, 1944 |

FOREIGN PATENTS

| Number | Country | Date |
| --- | --- | --- |
| 475,787 | British | Nov. 22, 1937 |